(12) United States Patent
Fornari et al.

(10) Patent No.: US 11,995,731 B1
(45) Date of Patent: May 28, 2024

(54) METHOD, APPARATUS, AND COMPUTER-READABLE MEDIUM FOR ARTIFACT GENERATION

(71) Applicant: OP3N, LLC, West Hollywood, CA (US)

(72) Inventors: Ricardo Augusto Nardim Fornari, San Jose, CA (US); Michael Robert Brown, Marina del Rey, CA (US); Nicholas George Nassim, San Francisco, CA (US); Satish Isukapalli Kumar, San Jose, CA (US)

(73) Assignee: OP3N, LLC, West Hollywood, CA (US)

( * ) Notice: Subject to any disclaimer, the term of this patent is extended or adjusted under 35 U.S.C. 154(b) by 0 days.

(21) Appl. No.: 18/214,643

(22) Filed: Jun. 27, 2023

Related U.S. Application Data

(60) Provisional application No. 63/499,362, filed on May 1, 2023.

(51) Int. Cl.
*G06Q 50/18* (2012.01)

(52) U.S. Cl.
CPC ................... *G06Q 50/184* (2013.01)

(58) Field of Classification Search
USPC .......................................................... 705/310
See application file for complete search history.

(56) References Cited

U.S. PATENT DOCUMENTS

| | | | |
|---|---|---|---|
| 2019/0012442 A1* | 1/2019 | Hunegnaw | G06F 21/10 |
| 2021/0081196 A1* | 3/2021 | Polleri | G06F 11/3433 |
| 2021/0110004 A1* | 4/2021 | Ross | H04L 63/10 |
| 2023/0100422 A1* | 3/2023 | Jakobsson | G06Q 20/38215 |
| | | | 705/67 |

FOREIGN PATENT DOCUMENTS

| WO | WO-2018213692 A1 * | 11/2018 | ......... G06F 21/6218 |
|---|---|---|---|

OTHER PUBLICATIONS

Abdallah Atouani, Artifact and reference models for generative machine learning frameworks and build systems. In Proceedings of the 20th ACM SIGPLAN International Conference on Generative Programming: Concepts and Experiences (GPCE 2021) Association for Computing Machinery, New York, NY, USA, 55-68. (Year: 2021).*

* cited by examiner

*Primary Examiner* — Michael Young
(74) *Attorney, Agent, or Firm* — Anupma Sahay; Amardeep S. Grewal; Reed Smith LLP

(57) ABSTRACT

A method, apparatus, and computer-readable medium for artifact attribution is provided. The method can be performed by a generative system, or generative AI. The method can include storing a proprietary artifact created by a creator and terms of use for usage of the proprietary artifact defined by the creator. The method can also include generating a new artifact based on the proprietary artifact and the user's rights to the proprietary artifact. The method can also include determining an attribution for the new artifact.

23 Claims, 8 Drawing Sheets

Specialized Computing Environment

800

METHOD, APPARATUS, AND COMPUTER-READABLE MEDIUM FOR ARTIFACT GENERATION

CROSS-REFERENCE TO RELATED APPLICATION

This application claims priority to U.S. provisional patent application No. 63/499,362, filed May 1, 2023, the contents of which are incorporated by reference in their entirety.

BACKGROUND

Generative artificial intelligence (AI) generates new content based on existing material. Generative AI can build content models with publicly available material or content models to generate any new type of content, for example, new text, music, or art. Users leverage generative AI to generate desired new content. In some systems, users can provide a prompt, or a set of inputs or requests, to retrieve new content based on the prompt. The prompt can include any aspect of content, including the use of protected existing material with ownership constraints. For example, music may be copyrighted, prohibiting unauthorized use or distribution.

Creators of protected materials have vehicles to monitor reproduction in conventional content distribution mediums, e.g., by granting streaming platforms the right to reproduce copyrighted songs in exchange for monetary attribution. With generative AI, controls over data proliferation and usage are insufficient concerning protected material. Accordingly, creators may not have control over the use of their protected material by generative AI. For example, creators may be unable to control whether users can request generative AI to include protected material in new content. Further, creators may be unable to control the extent protected material can be included in new content, e.g., the frequency at which generative AI can use the protected material in new content or if users can prompt generative AI to alter the protected material. In addition, creators may not be able to define what attribution, monetary or non-monetary, they prefer to receive in exchange for use of their protected material. As creators may not have control over the inclusion of their protected material in new material, creators also may not receive any attribution, monetary or otherwise, for the use.

Therefore, content generation based on protected material can raise usage and attribution issues regarding the new content based on a lack of downstream control means. Improvements are needed in generative AI to validate or confirm users or models have permission from creators to request new content based on their protected material, allow creators to define parameters for using their protected material, and provide attribution to the creator for using their protected material.

SUMMARY

Figure 1:
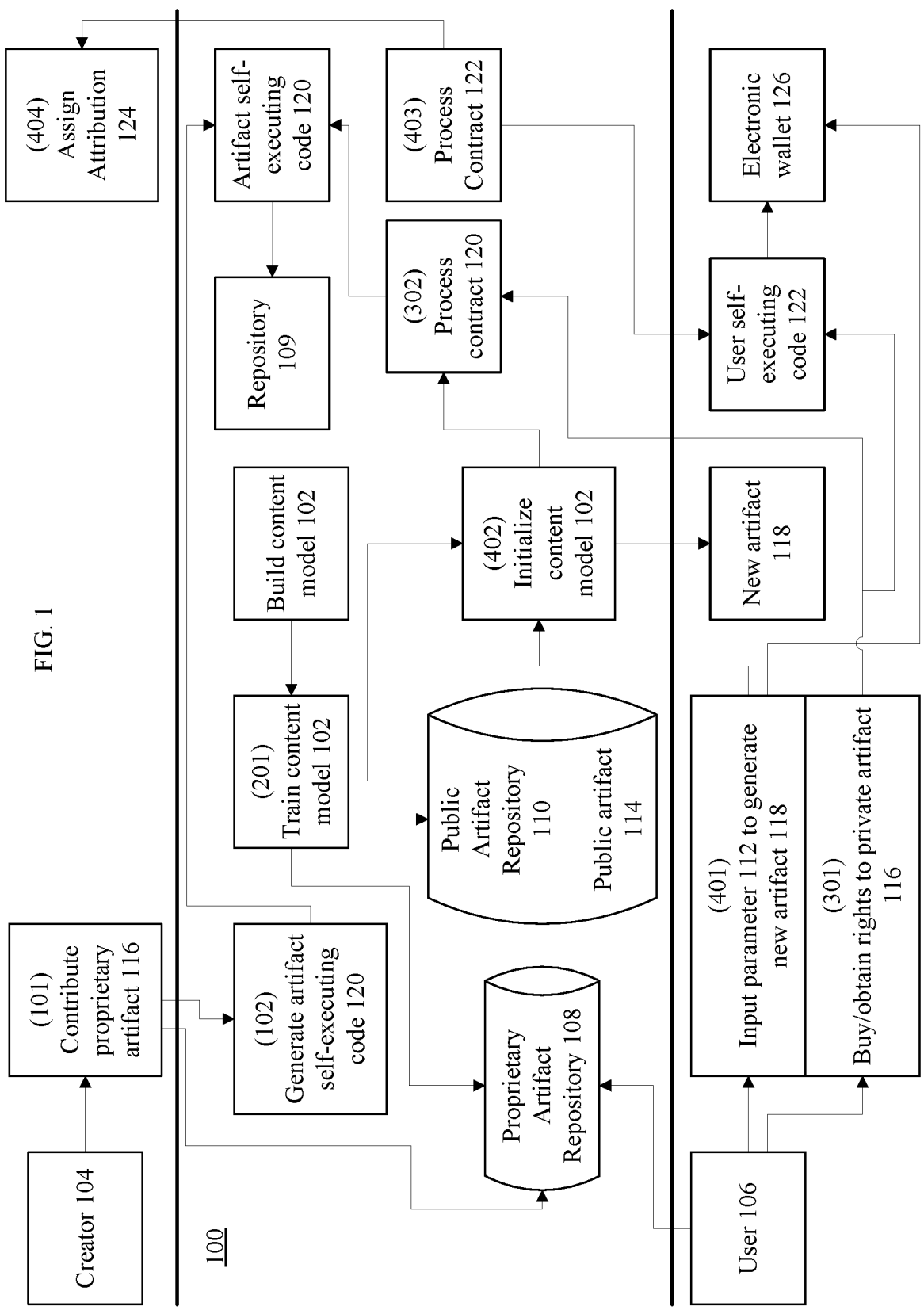
FIG. 1 illustrates a system and process flow chart of an artifact generation and attribution system according to an exemplary embodiment.

Embodiments provide a method for artifact generation by one or more computing devices of a generative system. The method can include receiving, by the generative system, a request from a user to generate a new artifact from a proprietary artifact, the request including one or more input parameters. The method can also include determining, by the generative system, whether the user has usage rights for the proprietary artifact. The method can also include determining, by the generative system, whether the one or more input parameters comply with one or more conditions in an artifact self-executing code corresponding to the proprietary artifact. The method can also include applying, by the generative system, a content model to the proprietary artifact and the one or more input parameters to generate the new artifact based at least in part on a determination that the user has the usage rights for the proprietary artifact and a determination that the one or more input parameters comply with the one or more conditions in the artifact self-executing code.

In some embodiments, the method also includes executing, by the generative system, an attribution action for the new artifact based at least in part on the artifact self-executing code. In some embodiments, the attribution action includes transmitting a monetary amount to a creator of the private artifact. In some embodiments, the attribution action includes transmitting a non-monetary value to a creator of the private artifact.

In some embodiments, the one or more input parameters includes at least one of text, graphics, photographs, sound, animation, video, interactivity, or multimedia.

In some embodiments, the determining, by the generative system, whether the user has the usage rights for the proprietary artifact includes identifying an electronic wallet; determining whether the electronic wallet contains a non-fungible token (NFT) in a plurality of unique NFTs corresponding to the proprietary artifact; and determining the user has the usage rights for the proprietary artifact based on the NFT in the plurality of unique NFTs corresponding to the proprietary artifact.

In some embodiments, ownership of the proprietary artifact is defined in at least one of the artifact self-executing code or a blockchain.

In some embodiments, the artifact self-executing code is defined by a creator of the proprietary artifact.

In some embodiments, the determining, by the generative system, whether the one or more input parameters comply with the one or more conditions in the artifact self-executing code corresponding to the proprietary artifact includes processing a user self-executing code generated based on the artifact self-executing code, the user self-executing code containing at least a portion of the one or more conditions from the artifact self-executing code corresponding to the proprietary artifact.

In some embodiments, the applying, by the generative system, the content model to the proprietary artifact and the one or more input parameters to generate the new artifact based at least in part on the determination that the user has the usage rights for the proprietary artifact and the determination that the one or more input parameters comply with the one or more conditions in the artifact self-executing code includes training the content model based on at least one of public artifacts and the proprietary artifact; determining whether the content model can be trained based on the proprietary artifact; and determining the content model can be trained based on the proprietary artifact by processing the artifact self-executing code and verifying that the one or more conditions in the artifact self-executing code corresponding to the proprietary artifact permit the training based on the proprietary artifact.

In some embodiments, the artifact self-executing code is a smart contract.

Embodiments provide an apparatus for artifact generation by a generative system. The apparatus can include one or more processors. The apparatus can also include one or more memories operatively coupled to at least one of the one or more processors and having instructions stored thereon that, when executed by at least one of the one or more processors, cause the at least one of the one or more processors to: receive a request from a user to generate a new artifact from a proprietary artifact, the request including one or more input parameters; determine whether the user has usage rights for the proprietary artifact; determine whether the one or more input parameters comply with one or more conditions in an artifact self-executing code corresponding to the proprietary artifact; and apply a content model to the proprietary artifact and the one or more input parameters to generate the new artifact based at least in part on a determination that the user has the usage rights for the proprietary artifact and a determination that the one or more input parameters comply with the one or more conditions in the artifact self-executing code.

In some embodiments, the instructions, that when executed by the at least one of the one or more processors, further cause the at least one of the one or more processors to execute an attribution action for the new artifact based at least in part on the artifact self-executing code. The attribution action includes one or more of transmitting a monetary amount to a creator of the proprietary artifact, transmitting demographic information to a creator of the proprietary artifact, or receiving a license for usage of the proprietary artifact.

In some embodiments, the one or more input parameters includes at least one of text, graphics, photographs, sound, animation, video, interactivity, or multimedia.

In some embodiments, the instructions that, when executed by at least one of the one or more processors, cause the at least one of the one or more processors to determine whether the user has the usage rights for the proprietary artifact further cause the at least one of the one or more processors to: identify an electronic wallet; determine whether the electronic wallet contains an NFT in a plurality of unique NFTs corresponding to the proprietary artifact; and determine the user has the usage rights for the proprietary artifact based on the NFT in the plurality of unique NFTs corresponding to the proprietary artifact.

In some embodiments, wherein the instructions that, when executed by at least one of the one or more processors, cause the at least one of the one or more processors to determine whether the one or more input parameters comply with the one or more conditions in the artifact self-executing code corresponding to the proprietary artifact further cause the at least one of the one or more processors to: process a user self-executing code generated based on the artifact self-executing code, the user self-executing code containing at least a portion of the one or more conditions from the artifact self-executing code corresponding to the proprietary artifact.

In some embodiments, wherein the instructions that, when executed by at least one of the one or more processors, cause the at least one of the one or more processors to apply the content model to the proprietary artifact and the one or more input parameters to generate the new artifact based at least in part on the determination that the user has the usage rights for the proprietary artifact and the determination that the one or more input parameters comply with the one or more conditions in the artifact self-executing code further cause the at least one of the one or more processors to: train the content model based on at least one of public artifacts and the proprietary artifact; determine whether the content model can be trained based on the proprietary artifact; and determine the content model can be trained based on the proprietary artifact by processing the artifact self-executing code and verifying that the one or more conditions in the artifact self-executing code corresponding to the proprietary artifact permit the training based on the proprietary artifact.

Embodiments provide at least one non-transitory computer-readable medium storing computer-readable instructions that, when executed by one or more computing devices, cause at least one of the one or more computing devices to: receive a request from a user to generate a new artifact from a proprietary artifact, the request including one or more input parameters; determine whether the user has usage rights for the proprietary artifact; determine whether the one or more input parameters comply with one or more conditions in an artifact self-executing code corresponding to the proprietary artifact; and apply a content model to the proprietary artifact and the one or more input parameters to generate the new artifact based at least in part on a determination that the user has the usage rights for the proprietary artifact and a determination that the one or more input parameters comply with the one or more conditions in the artifact self-executing code.

In some embodiments, the instructions, that when executed by the at least one of the one or more computing devices, further cause the at least one of the one or more computing devices to: execute an attribution action for the new artifact based at least in part on the artifact self-executing code. The attribution action includes one or more of transmitting a monetary amount to a creator of the proprietary artifact, transmitting demographic information to a creator of the proprietary artifact, or receiving a license for usage of the proprietary artifact.

In some embodiments, the one or more input parameters includes at least one of text, graphics, photographs, sound, animation, video, interactivity, or multimedia.

In some embodiments, the instructions that, when executed by at least one of the one or more computing devices, cause the at least one of the one or more computing devices to determine whether the user has the usage rights for the proprietary artifact further cause the at least one of the one or more computing devices to: identify an electronic wallet; determine whether the electronic wallet contains an NFT in a plurality of unique NFTs corresponding to the proprietary artifact; and determine the user has the usage rights for the proprietary artifact based on the NFT in the plurality of unique NFTs corresponding to the proprietary artifact.

In some embodiments, the instructions that, when executed by at least one of the one or more computing devices, cause the at least one of the one or more computing devices to determine whether the one or more input parameters comply with the one or more conditions in the artifact self-executing code corresponding to the proprietary artifact further cause the at least one of the one or more computing devices to: process a user self-executing code generated based on the artifact self-executing code, the user self-executing code containing at least a portion of the one or more conditions from the artifact self-executing code corresponding to the proprietary artifact.

In some embodiments, the instructions that, when executed by at least one of the one or more computing devices, cause the at least one of the one or more computing devices to apply the content model to the proprietary artifact and the one or more input parameters to generate the new artifact based at least in part on the determination that the user has the usage rights for the proprietary artifact and the determination that the one or more input parameters comply with the one or more conditions in the artifact self-executing code further cause the at least one of the one or more computing devices to: train the content model based on at least one of public artifacts and the proprietary artifact; determine whether the content model can be trained based on the proprietary artifact; and determine the content model can be trained based on the proprietary artifact by processing the artifact self-executing code and verifying that the one or more conditions in the artifact self-executing code corresponding to the proprietary artifact permit the training based on the proprietary artifact.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate also comprise a portion of the invention. However, because such elements do not facilitate a better understanding of the invention, a description of such elements is not provided herein.

Applicant has discovered a novel method, apparatus, and computer-readable medium for content generation and attribution that solves the above-mentioned problems. As discussed herein, creators can contribute protected material, or proprietary artifacts, to a generative AI system. Self-executing code, e.g., a smart contract, associated with the proprietary artifact can be generated, defining the terms of use of the proprietary artifact. For example, the creator can define in the artifact self-executing code that the proprietary artifact cannot be altered when included in new material generated by the generative AI system. The artifact self-executing code can also define the attribution that is assigned when the proprietary artifact is used in new material. The attribution can be monetary such that a payment is provided to the creator when the proprietary artifact is used in new material. In this way, creators can control data proliferation and usage concerning their proprietary artifact, and obtain attribution for usage of their proprietary artifact.

Users can obtain rights to the proprietary artifact such as by purchasing an NFT in a plurality of unique NFTs associated with the proprietary artifact. The rights obtained can be defined in user self-executing code based on the artifact self-executing code. When the user is ready to have the generative AI system generate a new artifact, the user can provide a prompt to the generative AI system that includes usage of the proprietary artifact. The generative AI system can verify the rights of the user to the proprietary artifact by processing the user self-executing code. Processing the user self-executing code to generate the new artifact based on the proprietary artifact can include assigning attribution to the creator.

The novel method, apparatus, and computer-readable medium will now be discussed with reference to the figures. FIG. 1 illustrates a system and process flow chart of an artifact generation and attribution system, according to an exemplary embodiment. As discussed below, the method for attribution can also be for a proprietary artifact 116.

Generating new artifact 118, which follows several of the steps shown in FIG. 1 performed by generative system 100, is performed by a generative AI. Generative AI can involve the use of machine learning algorithms and neural network models to generate novel content such as images, music, videos, games and text. However, ownership of the novel content can be difficult to establish. In addition, payment, or attribution 124, to creator 104 for generating of the novel content can be difficult to procure. As described herein, generative system 100 can utilize NFTs to define ownership and authenticity for digital assets. NFTs as part of generative system 100 will be described further below.

Generative system 100 can include one or more databases, servers, data stores and other components communicatively coupled over a computer network. As NFTs can be traded on various marketplaces, providing a means for owners of digital assets to monetize and authenticate their assets, generative system 100, or components or steps thereof, e.g., training the content model or initializing the content model, can be integrated with external platforms. Accordingly, external generative systems 100 can utilize the method for attribution 124 for a new artifact 118 described herein. Additionally or alternatively, generative system 100 can be a standalone platform.

In an example, generative system 100 can be integrated with external platforms such that portions of generative system 100 are externalized with no residual data. Accordingly, generative system 100 can include both internal and external components. In this way, generative system 100 can leverage a transient data that auto-purges the data within a predetermined time, such as in up to 24 hours, after delivering the data back to the service requester, e.g. user 106, in generative system 100. In another example, generative system 100 can be integrated with external platforms such that storage of results, e.g., new artifact 118, is externalized. In this way, databases can store the parameters, e.g., prompts or instructions from user 106 and proprietary artifact 116 and/or public artifacts, and the results and inform service requesters in generative system 100 of changes on the parameters that generated the response. However, generative system 100 cannot re-evaluate the data. In another example, generative system 100 can be integrated with external platforms such that artifacts, e.g., proprietary artifact 116 and/or public artifacts, are stored externally. Generative system 100 can run in parallel to generate new artifacts 118 with attribution 124.

Referring to FIG. 1, step 101 can be from the perspective of creator 104. Step 201 can be from the perspective of generative system 100. Step 301 can be from the perspective of user 106. Step 401 can be from the perspective of user 106.

Figure 2:
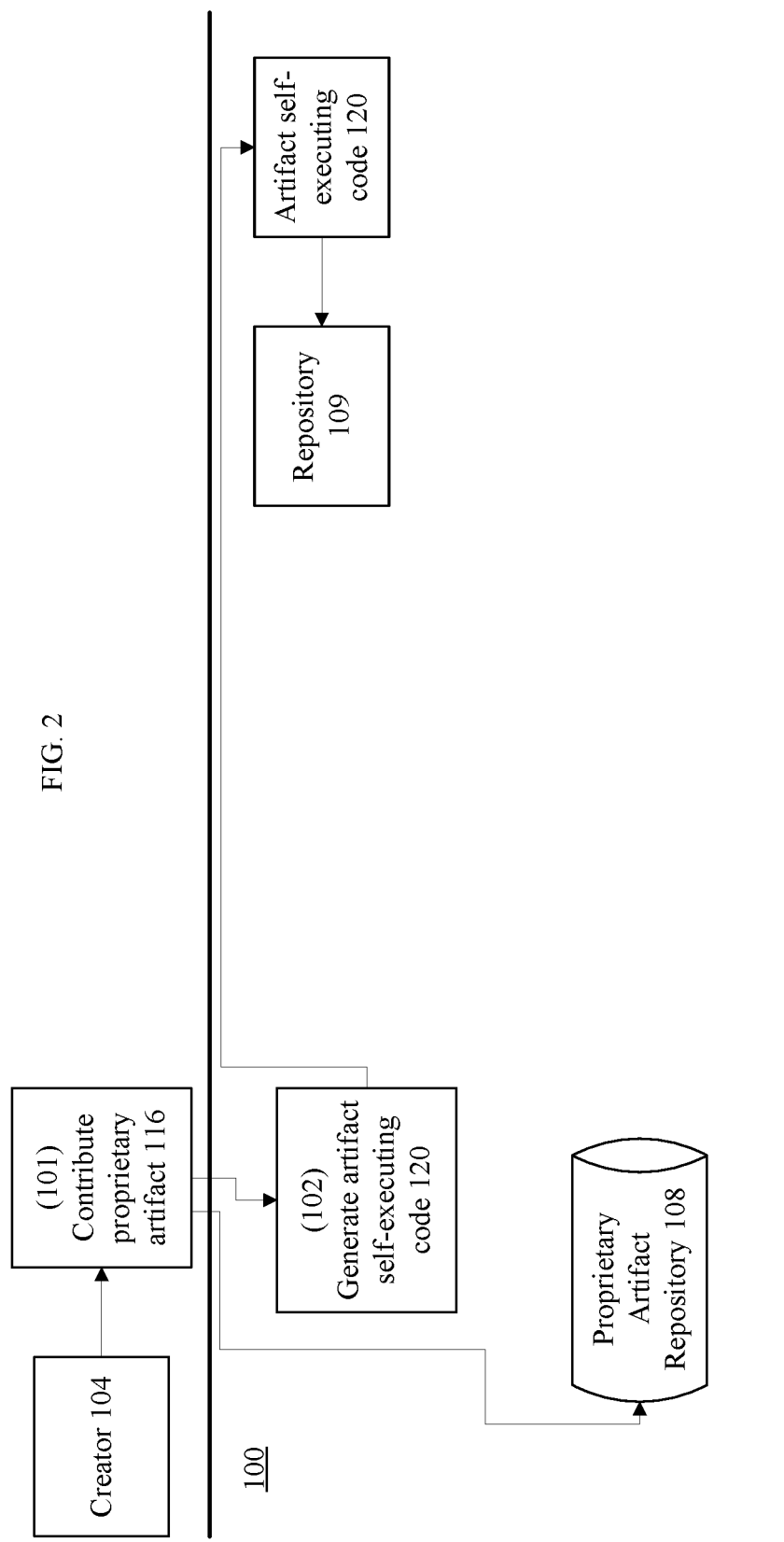
FIG. 2 illustrates a system and process flow chart of an artifact generation and attribution system according to an exemplary embodiment.

At step 101, shown in FIGS. 1-2, proprietary artifact 116 generated by a creator 104 can be contributed to generative system 100. Creators 104 can be artists, writers, producers, or designers, for example. Creators 104 own their work and contribute proprietary artifacts 116 to a private, or proprietary, artifact repository 108 to maintain ownership. Proprietary artifact 116 can be propriety content, such as a making of creator 104, such as text, music, or art, for example, stored as digital content (e.g., an image or file). Other examples of proprietary artifact 116 can include a fictional character, video or pictographic content, audiovisual content, software, video games or other gaming content, message boards, forums, or any other type of content. Proprietary artifact 116 can be owned by creator 104 (e.g., via copyright protection or an NFT associated with proprietary artifact 116) such that unauthorized use or distribution of proprietary artifact 116 is prohibited. Users 106 of the generative platform can have the opportunity to obtain or purchase legal rights to proprietary artifact 116. In this way, ownership of proprietary artifact 116 is maintained, or provided to a user 106 in exchange for a non-monetary or monetary compensation, or attribution 124, when proprietary artifact 116 is used by generative AI to produce new artifacts 118. As shown, proprietary artifact 116 can be stored in proprietary artifact repository 108. Proprietary artifact repository 108 having proprietary artifact 116 can be viewed by the public, e.g., user 106. However, user 106 cannot use proprietary artifact 116 without obtaining rights to proprietary artifact 116.

Contributing proprietary artifact 116 by creator 104 to proprietary artifact repository 108 can assign attribution to proprietary artifact 116. At step 102, shown in FIGS. 1-2, an artifact self-executing code 120 associated with proprietary artifact 116 can be generated when creator 104 contributes proprietary artifact 116. Self-executing code, such as artifact self-executing code 120, can be a self-executing contract, or computer program recorded on a blockchain, for example. The self-executing code or smart contract on the blockchain will list the terms of use for using the proprietary artifact 116 as defined in the self-executing code or smart contract. Alternatively, self-executing code can correspond to a plurality of transfer data structures on a distributed file system.

The terms of use can be defined by creator 104 and can identify permissions to use the proprietary artifact 116 as an input to generative AI, such as generative system 100. For example, the terms of use for proprietary artifact 116 can allow new artifact 118 to be inspired by proprietary artifact 116. Inspired generated content has generative AI leveraging signals and parameters of a proprietary artifact 116 to generate a new artifact 118. Inspired generated content can be limited in usage or ownership. Accordingly, proprietary artifact 116 may not be exactly replicated in new artifact 118, or ownership may be retained by creator 104. An example of inspired generated content includes using a trained singer to style and assist a user 106 via a proprietary artifact 116 to sing a song. In this case, the trained singer is not being exactly replicated in new artifact 118. Instead, the trained singer is assisting user 106 to apply user 106's own voice in new artifact 118. In addition, with inspired content, the terms of use can define that new artifact 118 generated by generative AI belongs to user 106 generating the new artifact 118. Alternatively, creator 104 can define terms of use for proprietary artifact 116 differently when new artifact is inspired by proprietary artifact 116. For example, creator 104 can define that new artifact 118 inspired by proprietary artifact 116 belongs to creator 104.

Additionally or alternatively, the terms of use for proprietary artifact 116 can allow new artifact 118 to apply proprietary artifact 116. Applied generated content has generative AI replacing content based on a proprietary artifact 116. An example of applied generated content includes generating a video and replacing a person in the video with a public figure, whose likeness is protected via proprietary artifact 116. Proprietary artifact 116 is unchanged or limited such that the entirety of proprietary artifact 116 is applied in new artifact 118. In this case, the terms of use of new artifact 118 generated by the generative AI belongs to creator 104 of proprietary artifact 116. Alternatively, creator 104 can define terms of use for proprietary artifact 116 differently when new artifact applies proprietary artifact 116. For example, creator 104 can define that new artifact 118 that applies proprietary artifact 116 belongs to user 106. Accordingly, artifact self-executing code 120 can define the terms and conditions for usage of proprietary artifact 116.

Artifact self-executing code 120 can also include ownership information of proprietary artifact 116. For example, the ownership information can identify creator 104 as the owner of proprietary artifact 116. In this way, ownership of proprietary artifact 116 can be determined. Artifact self-executing code 120 can be stored in a repository 109. Additionally or alternatively, the artifact self-executing code 120 can be stored in proprietary artifact repository 108.

Figure 3:
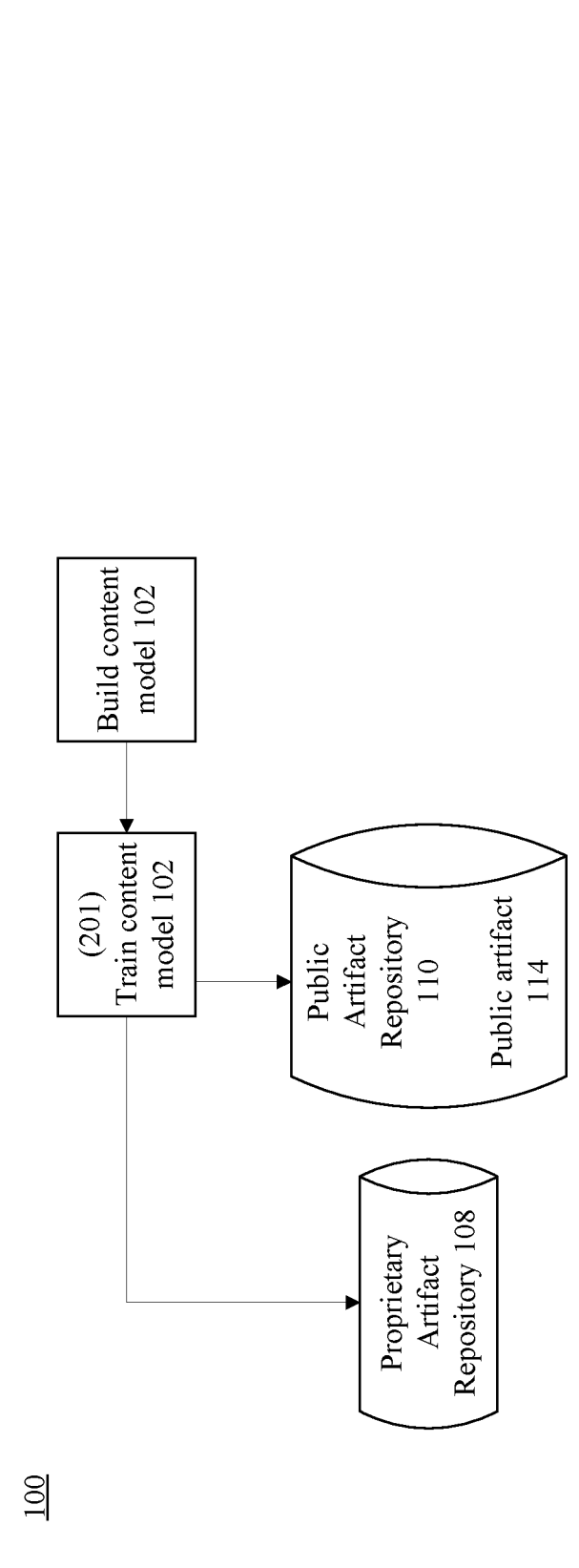
FIG. 3 illustrates a system and process flow chart of an artifact generation and attribution system according to an exemplary embodiment

Referring to FIGS. 1 and 3, at step 201, generative system 100 can train a content model 102. Content model 102 can be trained based at least in part on a public artifact 114 according to an exemplary embodiment. Each of the steps shown in FIG. 3 are performed by generative system 100. A public artifact 114 can be stored in a public artifact repository 110, public artifact 114 being publicly available. Public artifacts 114 may be available from the internet. Public artifacts 114 may be available from certain databases, such as government or public websites, for example. Public artifacts 114 can be used without restriction by generative AI and can include artifacts that content model 102 has used for training, or is permitted to use for training, such as copyrighted or otherwise protected material that is licensed, artifacts available under a creative commons license, and/or artifacts in the public domain. Optionally, the public artifacts repository 110 can include non-public artifacts which are licensed for use with the generative system. Such training based on public artifacts 114 can be unsupervised. At step 202, generative system 100 can train content model 102 with sample data. For example, content model 102 can receive sample prompts or instructions for new artifact 118. Such training can be practice for runs prompted by user 106.

Content model 102 can be trained to generate a plurality of generated artifacts based on public artifact repository 110, new artifact 118 being one of the plurality of generated new artifacts 118. Generative system 100 utilizes public artifact repository 110, which can include public artifact 114 amongst a plurality of public artifacts 114, to train content model 102. For example, generative AI can review a plurality of texts to learn a manner of speech or music genre syntax. Generative AI can then generate artifacts having the manner of speech or music genre syntax contained in the publicly available texts.

Artifact self-executing code 120 can define whether proprietary artifact 116 stored in the proprietary artifact repository 108 can additionally be used to train content model 102, and the limits to such usage. Such training based on proprietary artifact 116 can be supervised. Supervised training involves a human overseeing training of content model 102. In one way, supervised training occurs as the artifact self-executing code 120 is accessed to determine the limits of usage of proprietary artifact 116 for training. Artifact self-executing code 120 can define how proprietary artifact 116 can be associated. For example, proprietary artifact 116 can be prevented from being used with certain words or images that may be damaging to the brand of creator 104. A shoe creator 104 may prevent having proprietary artifact 116 related to creator 104's shoe with another shoe brand, in an example. Accordingly, content model 102 can be prevented from being trained in certain ways to use proprietary artifact 116. Therefore, while supervised training can allow content model 102 to become familiar with proprietary artifact 116, creator 104 can limit how content model 102 trains with proprietary artifact 116.

Artifact self-executing code 120 can omit conditions relating to ownership and terms of use of proprietary artifact 116. Accordingly, content model 102 can freely use proprietary artifact 116 to generate new artifacts 118. In this way, creators 104 can provide content model 102 their proprietary artifact 116 without limitations on use and without receiving attribution 124. In addition, one or more rights to proprietary artifact 116 can be obtained via non-monetary means, e.g., gift, right of assignment, etc.

Figure 4:
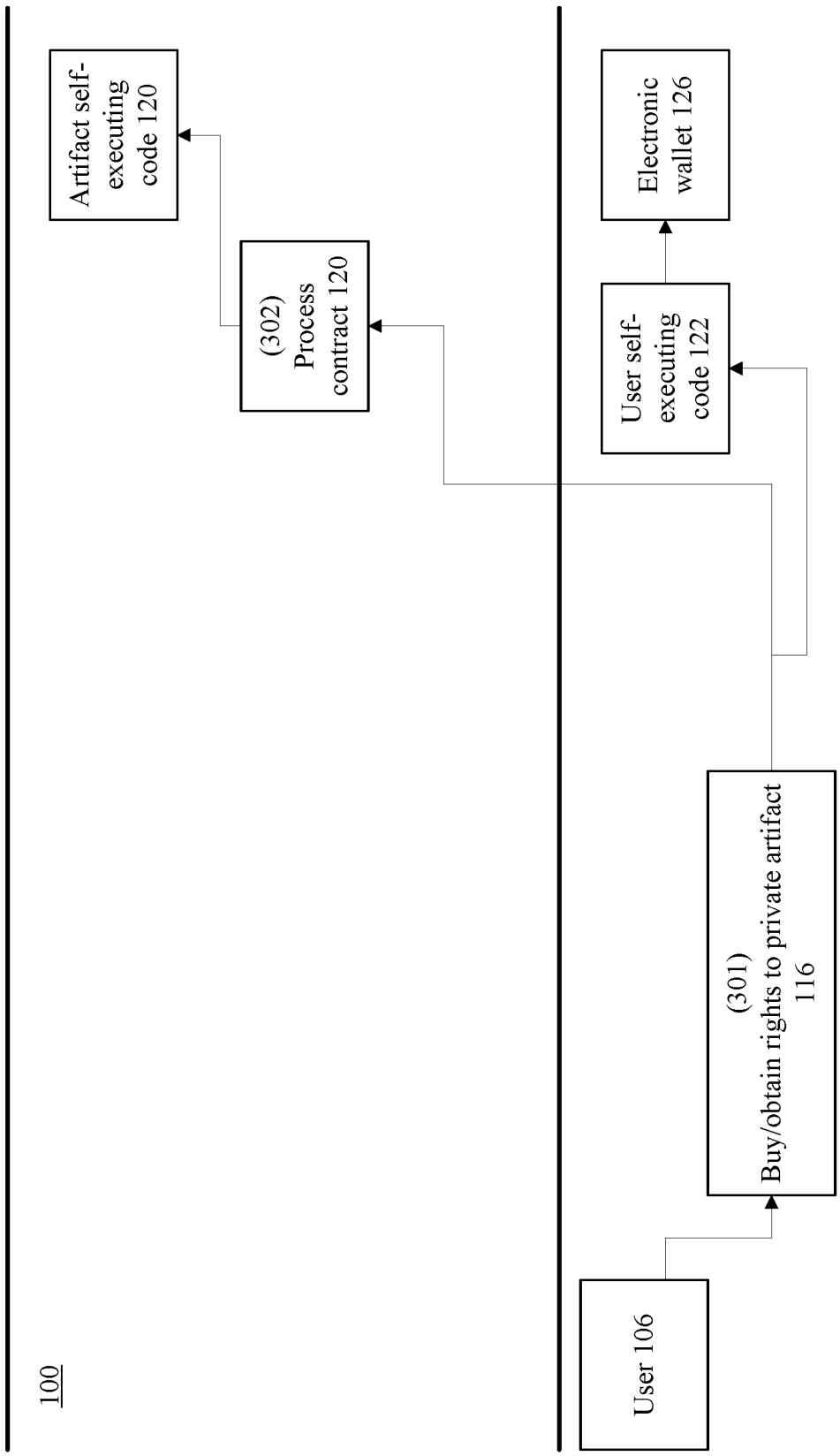
FIG. 4 illustrates a system and process flow chart of an artifact generation and attribution system according to an exemplary embodiment.

Alternatively, referring to FIGS. 1 and 4, at step 301 user 106 can obtain one or more rights to proprietary artifact 116, such as by buying one or more rights. For example, user 106's rights to proprietary artifact 116 can require an NFT in a plurality of unique NFTs associated with proprietary artifact 116. NFTs are unique tokens that represent a good or asset, such as an item of digital content (e.g., an image or file). NFTs are generated from an underlying digital content item and then recorded on a blockchain. The transaction on the blockchain will list an owner for the NFT and can include metadata about the digital content item, the generation of the NFT, and other information based upon or derived from the digital content item or NFT. For example, the blockchain can store some hash value derived from the NFT, which can function as an identifier. Artifact self-executing code 120 associated with proprietary artifact 116 can also be stored on the blockchain with the plurality of unique NFTs associated with proprietary artifact 116. Proprietary artifact 116 may only be accessible to the user 106 with one of the NFTs in the plurality of unique NFTs associated with proprietary artifact 116.

Each proprietary artifact 116 in proprietary artifact repository 108 can be accessible only to users 106 granted access to proprietary artifact 116 (e.g., users 106 having an NFT in a plurality of unique NFTs required for access to proprietary artifact 116). There may be different tiers of access to a particular proprietary artifact 116. For example, a lower tier can allow a user 106 to generate a new artifact 118 that is only inspired by a proprietary artifact 116. A higher tier can allow a user 106 to generate a new artifact 118 by applying a proprietary artifact 116. Inspiration and application of proprietary artifact 116 will be discussed further below.

To obtain or purchase an NFT associated with proprietary artifact 116, user 106 can buy rights through generative system 100 or an external platform or marketplace. After purchase, generative system 100, for example, can identify an electronic wallet having an NFT in a plurality of unique NFTs required to use proprietary artifact 116, the electronic wallet and NFT being external to generative system 100. Alternatively, after purchase, generative system 100 or an eternal platform can mint a new NFT in the plurality of unique NFTs based at least in part on a determination that electronic wallet 126 does not contain an NFT in a plurality of unique NFTs required to use proprietary artifact 116. Minting the new NFT can include determining, by generative system 100, whether user 106 has electronic wallet 126; generating, by generative system 100, a new electronic wallet corresponding to user 106 based at least in part on a determination that user 106 does not have electronic wallet; and transmitting, by generative system 100, access information for the new electronic wallet to user 106. Additionally or alternatively, minting the new NFT can include recording, by generative system 100, one or more transactions associated with the new NFT on a blockchain, the one or more transactions assigning ownership of the new NFT to user 106; and signing, by generative system 100, the one or more transactions with either an electronic wallet 126 of user 106 or an electronic wallet associated with content model 102.

NFTs can be minted through smart contracts that assign ownership and manage the transferability of the NFTs. When an NFT is generated or minted, code stored in smart contracts is executed that conforms to different standards, such as ERC-721. This information is added to the blockchain where the NFT is being managed. The one or more transactions can be a single transaction that assigns ownership of the NFT to user 106 or multiple transactions that ultimately assign ownership of the NFT to user 106. For example, an initial transaction can assign ownership of the NFT to generative system 100 or an account associated with generative system 100 and a second transaction can be used to transfer ownership of the NFT to an electronic wallet 126 of a user 106.

When obtaining or purchasing the NFT associated with proprietary artifact 116, in step 302, the terms of use for usage of proprietary artifact 116 can be verified. In this way, artifact self-executing code 120 can be processed. Artifact self-executing code 120 can be accessed to determine what rights are available to user 106 for purchase. For example, artifact self-executing code 120 can define whether new artifact 118 can be inspired by proprietary artifact 116 or applied by proprietary artifact 116. In an example where proprietary artifact 116 is a fictional character having a particular appearance, voice, and tagline, artifact self-executing code 120 can define the limits of inspiration. Artifact self-executing code 120 can limit inspiration to the appearance of the fictional character if a first NFT in a plurality of unique NFTs associated with proprietary artifact 116 is purchased. Artifact self-executing code 120 can limit inspiration to the appearance and voice of the fictional character if a second NFT in a plurality of unique NFTs associated with proprietary artifact 116 is purchased. Artifact self-executing code 120 can prevent alteration of the fictional character, for example, changing the fictional character's voice or appearance. Artifact self-executing code 120 can limit the number of times new artifacts 118 can be inspired by or can apply proprietary artifact 116 if a third NFT in a plurality of unique NFTs associated with proprietary artifact 116 is purchased. For example, purchase of the third NFT can allow proprietary artifact 116 to inspire new artifacts 118 or be applied up to ten times. In other words, the inspiration or application can occur in ten separate new artifacts 118. Additionally, the artifact self-executing code 120 can allow proprietary artifact 116 to be applied if a fourth NFT in a plurality of unique NFTs associated with proprietary artifact 116 is purchased. Creators 104 may structure artifact self-executing code 120 in ways giving various ownership, use, copying, or other rights to users 106, including removing any limitations on usage of proprietary artifact 116.

Artifact self-executing code 120 can be accessed to determine ownership of the new artifact 118 that is inspired by or applies proprietary artifact 116. As discussed, one of the plurality of unique NFTs can allow new artifact 118 to be generated by content model 102 such that new artifact 118 is inspired by proprietary artifact 116. In this way, the ownership for new artifact 118 can be to either creator 104 or user 106, as defined by artifact self-executing code 120. Alternatively, a second one of the plurality of unique NFTs can allow new artifact 118 to be generated by content model 102 such that new artifact 118 applies proprietary artifact 116. In this way, the ownership for new artifact 118 is to creator 104, as defined by artifact self-executing code 120. While generally, new artifacts 118 applying proprietary artifact 116 are owned by creator 104, creator 104 can alter this ownership in view of inspiration from and application of proprietary artifact 116 via the terms and conditions for usage of proprietary artifact 116.

Creator 104 can define non-monetary attributions 124, such as ownership, in artifact self-executing code 120 for user 106 to obtain an NFT associated with proprietary artifact 116 to use proprietary artifact 116 for generating a new artifact 118. Another non-monetary attribution 124 can be to provide data regarding user 106 to creator 104. Data regarding user 106 can include, for example, a name, an age, email address, physical address, and/or an occupation of user 106. In other words, creator 104 can obtain a profile of personal information of user 106, such as demographic information, or access to user 106's contacts, for example. Creator 104 can additionally or alternatively obtain non-demographic information of user 106, such as education level, socioeconomic status, etc. In this way, users 106 can obtain rights to proprietary artifact 116 without purchase. Another non-monetary attribution 124 can be to mention creator 104, or an entity of creator 104, with new artifact 118. For example, new artifact 118 can include creator 104's name or a link to creator 104's website. Other non-monetary attributions 124 can include aggregate information of users 106 that obtain rights to proprietary artifact 116. In this way, creator 104 can obtain demographic or non-demographic information of a plurality of users 106 that is anonymized with respect to any particular user 106.

Additionally or alternatively, creator 104 can require monetary attribution 124, or payment, in artifact self-executing code 120 for user 106 to use proprietary artifact 116 for generating a new artifact 118. Such a payment can be a royalty payment. The creator 104 can additionally or alternatively define in artifact self-executing code 120 to provide a monetary attribution 124 to each owner of an NFT of a plurality of unique NFTs required to use proprietary artifact 116 for generating a new artifact 118.

Creator 104 can define in artifact self-executing code 120 that no attribution 124 is required to use proprietary artifact 116. Accordingly, user 106 can use proprietary artifact 116 without providing creator 104 with a non-monetary or monetary attribution 124 after user 106 obtains rights to proprietary artifact 116.

When obtaining rights to proprietary artifact 116, user 106 can view terms of use that must be followed to generate new artifact 118 based on proprietary artifact 116. In other words, user 106 can view the terms of use of artifact self-executing code 120 before obtaining rights to proprietary artifact 116.

A user self-executing code 122 can define the rights obtained by user 106 in step 301. User self-executing code 122 can be based on, or derived from, artifact self-executing code 120. In other words, terms of use from artifact self-executing code 120 can be copied over to user self-executing code 122. User self-executing code 122 can include the terms of use that must be followed to generate new artifact 118 based on proprietary artifact 116. As in artifact self-executing code 122, non-monetary and/or monetary attributions 124 can also be contained in user self-executing code 122 for compliance by user 106 in generating one or more new artifacts 118. The new NFT with user self-executing code 122 can then be added to electronic wallet 126 of user 106, thereby allowing user 106 to use proprietary artifact 116 in a new artifact 118. Users 106 can view user self-executing code 122 prior to obtaining the new NFT. In this way, users 106 can view non-monetary and/or monetary attributions 124 they must comply with to use a proprietary artifact 116 to generate a new artifact 118 prior to obtaining rights to proprietary artifact 116.

Figure 5:
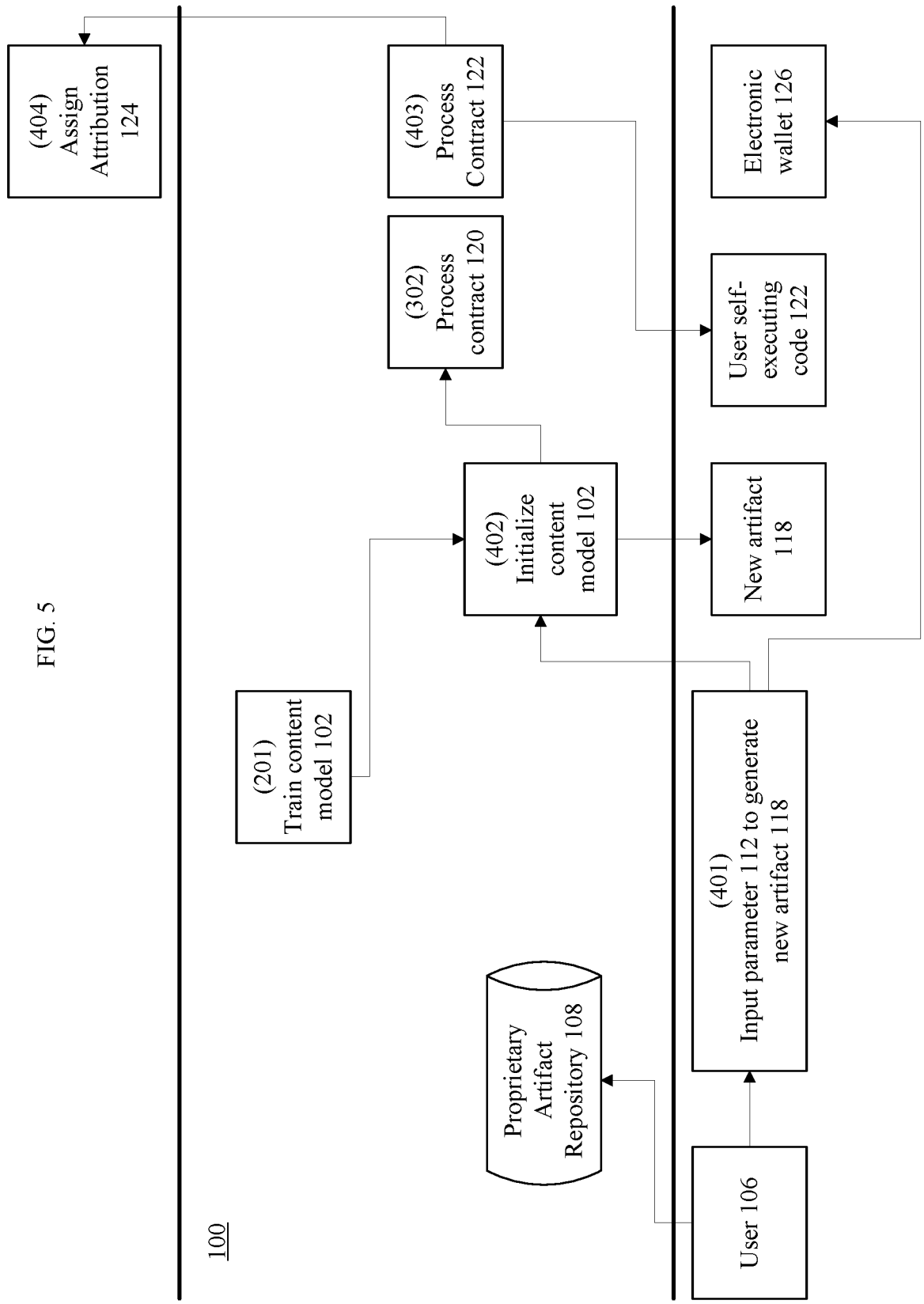
FIG. 5 illustrates a system and process flow chart of an artifact generation and attribution system according to an exemplary embodiment.

Referring to FIGS. 1 and 5, user 106 can use generative system 100, or an external platform, to generate a new artifact 118. At step 401, user 106 can provide one or more input parameters 112 to content model 102 to generate new artifact 118. Input parameter 112 can be a prompt or instructions, for example, to describe the details of new artifact 118. The prompt can include any aspect of content, e.g., text, graphics, photographs, sound, animation, video, interactivity, multimedia, etc. For example, the prompt can be "provide a realistic photograph of proprietary artifact 116 on plane flying over the ocean." In another example, input parameter 112 can include at least one of an environment, a story, or a text in or with which to use proprietary artifact 116. For example, the environment can be a forest, a school, or a boat. The story can include a scene in which a forest is being discovered, a school is being constructed, or a boat is being repaired. The text can be a name of the story, information about proprietary artifact 116, or another expression of user 106.

At step 402, content model 102 can be initialized to generate new artifact 118. To begin generating new artifact 118, content model 102 requires a starting point. Public artifact repository 110 can provide a starting point for producing new artifacts 118, which can be based, at least in part, on publicly available artifacts, e.g., public artifacts 114 In other words, public artifact repository 110 can have materials, e.g., publicly available artifacts, with which content model 102 can base training to generate new artifacts 118. Additionally or alternatively, proprietary artifact repository 108 can provide a starting point for producing new artifacts 118 if artifact self-executing code 120 provides such permissions.

At step 403, user self-executing code 112 can be accessed and verified. In other words, generative system 100, such as content model 102, can determine whether user 106 has an electronic wallet 126 containing one of a plurality of unique NFTs associated with proprietary artifact 116. A first NFT of the plurality of unique NFTs rights may define user 106's rights to proprietary artifact 116 based on the terms of use contained in user self-executing code 112, which can, for example, limit use to only generate inspired content. Accordingly, as discussed, user self-executing code 112 based on artifact self-executing code 120 can allow new artifact 118 to be generated by content model 102 such that new artifact 118 is inspired by proprietary artifact 116. Alternatively user 106's rights to proprietary artifact 116 may be elevated such that new artifact 118 can apply proprietary artifact 116. Accordingly, artifact self-executing code 120 can allow new artifact 118 to be generated by content model 102 such that new artifact 118 applies proprietary artifact 116 based on a second NFT of the plurality of unique NFTs associated with another user self-executing code 112 having different limitations on use. In addition, a certain NFT of the plurality of unique NFTs can prevent certain uses of proprietary artifact 116 in new artifact 118, such as preventing certain words or images from being used. Generative system 100, such as content model 102, can verify user self-executing code 122 generated based on artifact self-executing code 120 and the corresponding NFT, e.g., either the first NFT in the plurality of unique NFTs or the second NFT in the plurality of unique NFTs.

User self-executing code 122, based on artifact self-executing code 120 defined by creator 104, can be determinative on whether user 106 can revise generations based on the same prompt to obtain the desired new artifact 118. In some examples, generating a revised new artifact 118 while the prompt remains constant can require additional permissions from creator 104. In other examples, generating a revised new artifact 118 can be allowed while the prompt remains constant.

At step 404, an attribution 124 for new artifact 118 can be determined based on the artifact self-executing code 120. As discussed, attribution 124 can be non-monetary or monetary. The new artifact 118 can be generated based on user 106 providing the non-monetary or monetary attribution 124 to creator 104. User self-executing code 122 can define attribution 124 required for the transaction, where user self-executing code 122 is derived from artifact self-executing code 120 discussed above.

Figure 6:
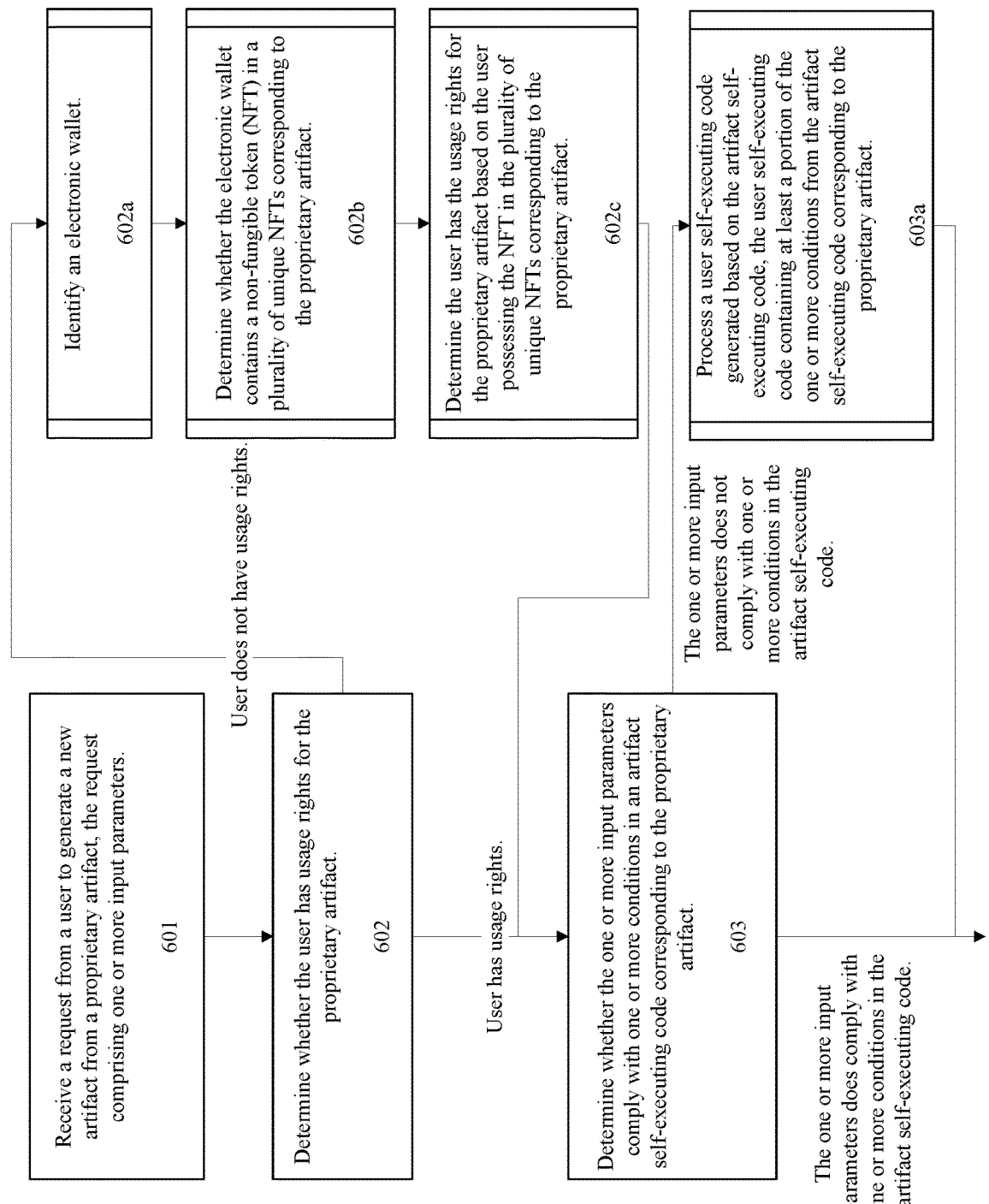
FIG. 6 illustrates a method for attribution for a new artifact according to an exemplary embodiment.

FIG. 6 illustrates a flowchart for generating an artifact by one or more computing devices of a generative system according to an exemplary embodiment. The generative system can be similar to generative system 100 discussed above.

At step 601, a request is received from a user to generate a new artifact from a proprietary artifact. The request can include one or more input parameters. Step 601 can be similar to step 401 discussed above. The user can be similar to user 106 discussed above. The new artifact can be similar to new artifact 118 discussed above. The proprietary artifact can be similar to proprietary artifact 116 discussed above. The one or more input parameters can be similar to input parameter 112 discussed above. As discussed above, the one or more input parameters can form a prompt. The one or more input parameters can take a number of forms. For example, as discussed above with respect to input parameter 112, the one or more input parameters can include at least one of text, graphics, photographs, sound, animation, video, interactivity, or multimedia.

At step 602, it is determined whether the user has usage rights for the proprietary artifact. Step 602 can be similar to steps 302 and 403 discussed above. For example, step 602 can be performed by performing steps 602a, 602b, and 602c, as shown. At step 602a, an electronic wallet is identified. The electronic wallet can be similar to electronic wallet 126. At step 602b, it is determined whether the electronic wallet contains an NFT in a plurality of unique NFTs corresponding to the proprietary artifact. At step 602c, it is determined that the user has the usage rights for the proprietary artifact based on the NFT in the plurality of unique NFTs corresponding to the proprietary artifact. Based on the NFT, usage of the proprietary artifact can be limited. For example, usage of the proprietary artifact can be limited to an appearance or voice of a fictional character comprised by the proprietary artifact. Alternatively, the fictional character comprised by the proprietary artifact can be wholly used, e.g., the appearance, voice, taglines, etc. all can be used. However, the fictional character comprised by the proprietary artifact cannot be altered. In another example, the frequency of usage of the proprietary artifact can be limited. In another example, certain words or images that may disparage the proprietary artifact can be prevented from being used with the proprietary artifact. Various ownership, use, copying, or rights can be precluded or conveyed based on the NFT, as discussed above with respect to step 302.

At step 603, it is determined whether the one or more input parameters comply with one or more conditions in an artifact self-executing code corresponding to the proprietary artifact. Step 603 can be similar to steps 302 and 403 discussed above. Step 602 can be similar to steps 302 and 403 discussed above. The artifact self-executing code can be similar to artifact self-executing code 120 discussed above. The creator can be similar to creator 104 discussed above. The artifact self-executing code can be defined by a creator of the proprietary artifact. Accordingly, the artifact self-executing code associated with the proprietary artifact can be generated when the creator contributes the proprietary artifact to a repository accessible to the user. As with artifact self-executing code 120, the artifact self-executing code can define the terms and conditions for usage of the proprietary artifact. The usage rights of the user in step 602 are limited by the artifact self-executing code. When obtaining or purchasing the NFT associated with the proprietary artifact, the terms of use for usage of the proprietary artifact can be verified and accessed to determine what rights are available to the user for purchase.

Ownership of the proprietary artifact can be defined in at least one of the artifact self-executing code or a blockchain. For example, the ownership information can identify the creator as the owner of the proprietary artifact. In addition, the creator can define monetary and non-monetary attributions, including ownership, in the artifact self-executing code.

Step 603 can be performed by performing step 603a, as shown. At step 603a, a user self-executing code generated based on the artifact self-executing code is processed. The user self-executing code can be similar to user self-executing code 122 discussed above. Accordingly, the user self-executing code can be derived from the artifact self-executing code such that terms of use from the artifact self-executing code can be copied over to the user self-executing code. In other words, the user self-executing code contains at least a portion of the one or more conditions from the artifact self-executing code corresponding to the proprietary artifact.

Figure 7:
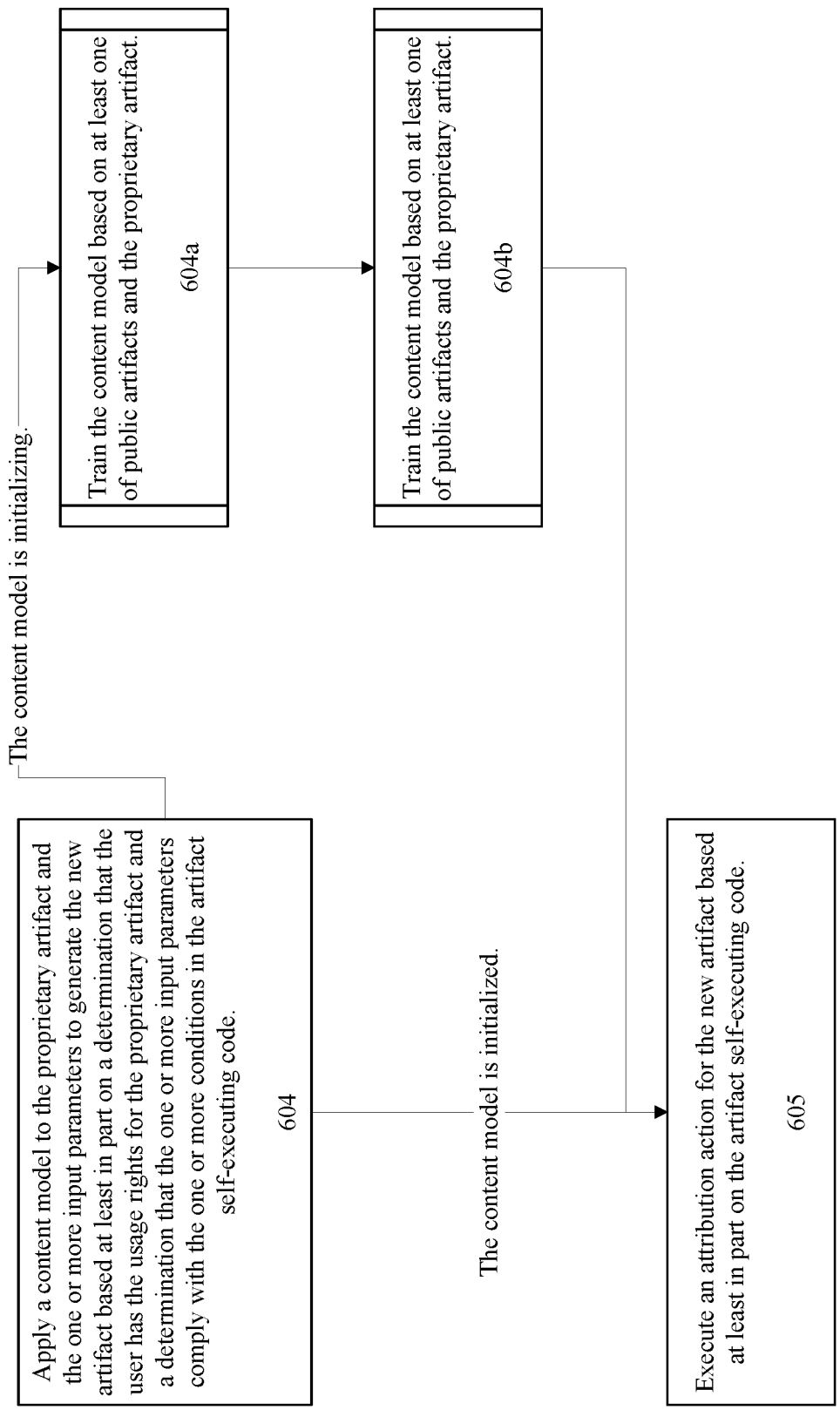
FIG. 7 illustrates a method for attribution for a new artifact according to an exemplary embodiment.

Step 604, shown in FIG. 7, can follow step 603. At step 604, a content model is applied to the proprietary artifact and the one or more input parameters to generate the new artifact based at least in part on a determination that the user has the usage rights for the proprietary artifact and a determination that the one or more input parameters comply with the one or more conditions in the artifact self-executing code. The content model can be similar to content model 102 discussed above. The content model can be trained to generate a plurality of generated artifacts. For example, generative AI can review a plurality of texts to learn a manner of speech or music genre syntax. The content model can then generate artifacts having the manner of speech or music genre syntax contained in the publicly available texts. In addition, the content model can be trained with sample data. For example, the content model can receive sample prompts or instructions.

Step 604 can be similar to steps 201, 202, and 402 discussed above. Step 604 can be performed by performing steps 604a and 604b, as shown. At step 604a, the content model can be based on at least one of public artifacts and the proprietary artifact is trained, where the at least one of public artifacts can be similar to public artifact 114 discussed above. Public artifacts can be available from the internet, e.g., government or public websites. Public artifacts may not be attributed to any entity, and instead are attributed to the public. Accordingly, public artifacts can be used without restriction by generative AI. Such training based on public artifacts can be unsupervised.

At step 604b, it is determined whether the content model can be trained based on the proprietary artifact. At step 604c, it is determined that the content model can be trained based on the proprietary artifact by processing the artifact self-executing code and verifying that the one or more conditions in the artifact self-executing code corresponding to the proprietary artifact permit the training based on the proprietary artifact. In this way, the content model can undergo supervised training. Alternatively, it can be determined that the content model cannot be trained based on the proprietary artifact by processing the artifact self-executing code and verifying that the one or more conditions in the artifact self-executing code corresponding to the proprietary artifact prevent the training based on the proprietary artifact.

Initializing the content model can include the content model having a starting point to generate the new artifact. The starting point can be based, at least in part, on publicly available artifacts. Additionally or alternatively, proprietary artifacts can provide a starting point if the respective artifact self-executing codes provide such permissions.

In some embodiments, step 605 can follow step 604. At step 605, an attribution action for the new artifact is executed based at least in part on the artifact self-executing code. Step 605 can be similar to step 404 discussed above. The attribution action can be similar to attribution 124 discussed above. The attribution action can take a number of forms. For example, the attribution action can include transmitting a monetary amount to a creator of the proprietary artifact, e.g., a royalty payment. In another example, the attribution action can include transmitting demographic information of the user to a creator of the proprietary artifact. The creator can additionally or alternatively obtain non-demographic information of the user. In this way, the user can obtain rights to the proprietary artifact without purchase. Another non-monetary attribution can be to mention the creator, or an entity of the creator, with the new artifact. For example, the new artifact can include the creator's name or a link to the creator's website. Other non-monetary attributions can include aggregate information of users that obtain rights to the proprietary artifact. In this way, the creator can obtain demographic or non-demographic information of a plurality of users that is anonymized with respect to any particular user.

Figure 8:
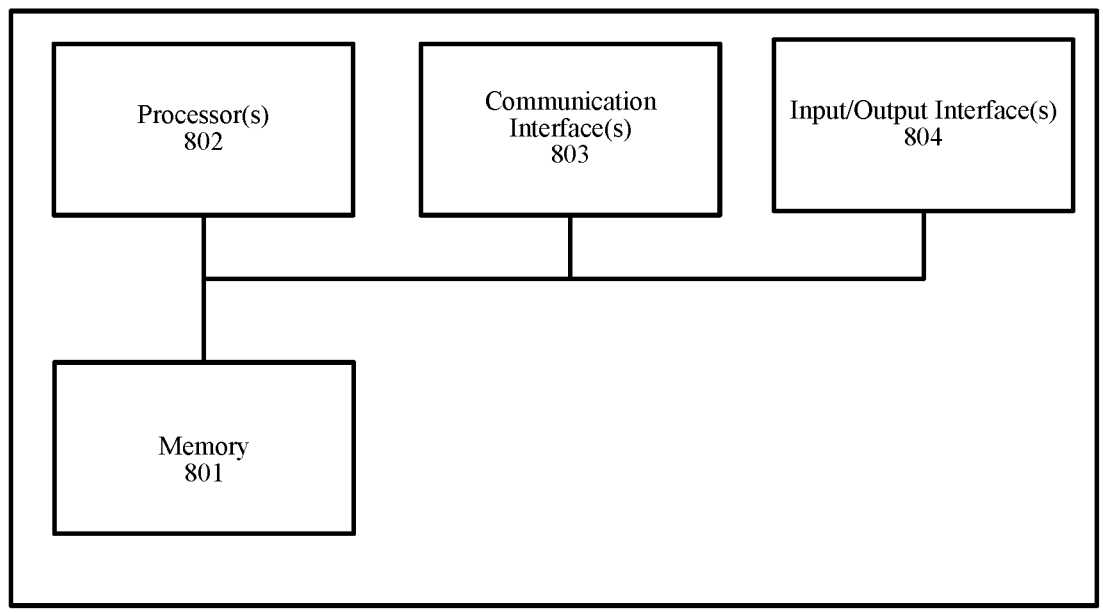
FIG. 8 illustrates the components of the specialized computing environment configured to perform the method for artifact generation according to the exemplary embodiments described herein.

FIG. 8 illustrates the components of a specialized computing environment 800 configured to perform the specialized processes described herein. Specialized computing environment 800 is a computing device that includes a memory 801 that is a non-transitory computer-readable medium and can be volatile memory (e.g., registers, cache, RAM), non-volatile memory (e.g., ROM, EEPROM, flash memory, etc.), or some combination of the two.

Memory can include a plurality of software components, with each of the software components in memory storing specialized instructions and data structures configured to perform the corresponding functionality and techniques described herein.

All of the software stored within memory 801 can be stored as a computer-readable instructions, that when executed by one or more processors 802, cause the processors to perform the functionality described with respect to FIGS. 1-7.

Processor(s) 802 execute computer-executable instructions and can be a real or virtual processors. In a multi-processing system, multiple processors or multicore processors can be used to execute computer-executable instructions to increase processing power and/or to execute certain software in parallel.

Specialized computing environment 800 additionally includes a communication interface 803, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 800 further includes input and output interfaces 1304 that allow users (such as system administrators) to provide input to the system to set parameters, to edit data stored in memory 801, or to perform other administrative functions.

An interconnection mechanism (shown as a solid line in FIG. 8), such as a bus, controller, or network interconnects the components of the specialized computing environment 800.

Input and output interfaces 804 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 800.

Specialized computing environment 800 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 800.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Elements of the described embodiment shown in software may be implemented in hardware and vice versa.

It will be appreciated by those skilled in the art that changes could be made to the embodiments described above without departing from the broad inventive concept thereof. For example, the steps or order of operation of one of the above-described methods could be rearranged or occur in a different series, as understood by those skilled in the art. It is understood, therefore, that this disclosure is not limited to the particular embodiments disclosed, but it is intended to cover modifications within the spirit and scope of the present disclosure.

The invention claimed is:

1. A method for artifact generation by one or more computing devices of a generative system, the method comprising: receiving, by the generative system, a request from a user to generate a new artifact from a proprietary artifact, the request comprising one or more input parameters; determining, by the generative system, whether the user has usage rights for the proprietary artifact; determining, by the generative system, whether the one or more input parameters comply with one or more conditions in an artifact self-executing code corresponding to the proprietary artifact; collecting, by the generative system, at least one public artifact, the at least one public artifact being accessible from a public domain; training, by the generative system, the content model in a first training based on the at least one of public artifact, the first training being unsupervised; determining, by the generative system, the content model can be trained based on the proprietary artifact by processing the artifact self-executing code and verifying that the one or more conditions in the artifact self-executing code corresponding to the proprietary artifact permit the training based on the proprietary artifact; training, by the generative system, the content model in a second training based on the propriety artifact, the second training being supervised based on the processing of the artifact self-executing code; and applying, by the generative system, the content model to the proprietary artifact and the one or more input parameters to generate the new artifact based at least in part on a determination that the user has the usage rights for the proprietary artifact and a determination that the one or more input parameters comply with the one or more conditions in the artifact self-executing code.

2. The method of claim 1, further comprising: executing, by the generative system, an attribution action for the new artifact based at least in part on the artifact self-executing code.

3. The method of claim 2, wherein the attribution action comprises transmitting a monetary amount to a creator of the proprietary artifact.

4. The method of claim 2, wherein the attribution action comprises transmitting non-monetary value to a creator of the proprietary artifact.

5. The method of claim 1, wherein the one or more input parameters comprises at least one of text, graphics, photographs, sound, animation, video, interactivity, or multimedia.

6. The method of claim 1, wherein determining, by the generative system, whether the user has the usage rights for the proprietary artifact comprises: identifying an electronic wallet; determining whether the electronic wallet contains a non-fungible token (NFT) in a plurality of unique NFTs corresponding to the proprietary artifact; and determining the user has the usage rights for the proprietary artifact based on the NFT in the plurality of unique NFTs corresponding to the proprietary artifact.

7. The method of claim 1, wherein ownership of the proprietary artifact is defined in at least one of the artifact self-executing code or a blockchain.

8. The method of claim 1, wherein the artifact self-executing code is defined by a creator of the proprietary artifact.

9. The method of claim 1, wherein the determining, by the generative system, whether the one or more input parameters comply with the one or more conditions in the artifact self-executing code corresponding to the proprietary artifact comprises: processing a user self-executing code generated based on the artifact self-executing code, the user self-executing code containing at least a portion of the one or more conditions from the artifact self-executing code corresponding to the proprietary artifact.

10. The method of claim 1, wherein the artifact self-executing code is a smart contract.

11. The method of claim 1, wherein the second training being supervised comprises preventing association of the proprietary artifact with at least one of a word or an image.

12. An apparatus for artifact generation by a generative system, comprising: one or more processors; and one or more memories operatively coupled to at least one of the one or more processors and having instructions stored thereon that, when executed by at least one of the one or more processors, cause the at least one of the one or more processors to: receive a request from a user to generate a new artifact from a proprietary artifact, the request comprising one or more input parameters; determine whether the user has usage rights for the proprietary artifact; determine whether the one or more input parameters comply with one or more conditions in an artifact self-executing code corresponding to the proprietary artifact; collect at least one public artifact, the at least one public artifact being accessible from a public domain; train the content model in a first training based on the at least one of public artifact, the first training being unsupervised; determine the content model can be trained based on the proprietary artifact by processing the artifact self-executing code and verifying that the one or more conditions in the artifact self-executing code corresponding to the proprietary artifact permit the training based on the proprietary artifact; train the content model in a second training based on the propriety artifact, the second training being supervised based on the processing of the artifact self-executing code; and apply the content model to the proprietary artifact and the one or more input parameters to generate the new artifact based at least in part on a determination that the user has the usage rights for the proprietary artifact and a determination that the one or more input parameters comply with the one or more conditions in the artifact self-executing code.

13. The apparatus of claim 12, wherein the instructions, that when executed by the at least one of the one or more processors, further cause the at least one of the one or more processors to: execute an attribution action for the new artifact based at least in part on the artifact self-executing code, wherein the attribution action comprises one or more of: transmitting a monetary amount to a creator of the proprietary artifact, transmitting demographic information to a creator of the proprietary artifact, or receiving a license for usage of the proprietary artifact.

14. The apparatus of claim 12, wherein the one or more input parameters comprises at least one of text, graphics, photographs, sound, animation, video, interactivity, or multimedia.

15. The apparatus of claim 12, wherein the instructions that, when executed by at least one of the one or more processors, cause the at least one of the one or more processors to determine whether the user has the usage rights for the proprietary artifact further cause the at least one of the one or more processors to: identify an electronic wallet; determine whether the electronic wallet contains an NFT in a plurality of unique NFTs corresponding to the proprietary artifact; and determine the user has the usage rights for the proprietary artifact based on the NFT in the plurality of unique NFTs corresponding to the proprietary artifact.

16. The apparatus of claim 12, wherein the instructions that, when executed by at least one of the one or more processors, cause the at least one of the one or more processors to determine whether the one or more input parameters comply with the one or more conditions in the artifact self-executing code corresponding to the proprietary artifact further cause the at least one of the one or more processors to: process a user self-executing code generated based on the artifact self-executing code, the user self-executing code containing at least a portion of the one or more conditions from the artifact self-executing code corresponding to the proprietary artifact.

17. The apparatus of claim 12, wherein the second training being supervised comprises preventing association of the proprietary artifact with at least one of a word or an image.

18. At least one non-transitory computer-readable medium storing computer-readable instructions that, when executed by one or more computing devices, cause at least one of the one or more computing devices to: receive a request from a user to generate a new artifact from a proprietary artifact, the request comprising one or more input parameters; determine whether the user has usage rights for the proprietary artifact; determine whether the one or more input parameters comply with one or more conditions in an artifact self-executing code corresponding to the proprietary artifact; collect at least one public artifact, the at least one public artifact being accessible from a public domain; train the content model in a first training based on the at least one of public artifact, the first training being unsupervised; determine the content model can be trained based on the proprietary artifact by processing the artifact self-executing code and verifying that the one or more conditions in the artifact self-executing code corresponding to the proprietary artifact permit the training based on the proprietary artifact; train the content model in a second training based on the propriety artifact, the second training being supervised based on the processing of the artifact self-executing code; and apply the content model to the proprietary artifact and the one or more input parameters to generate the new artifact based at least in part on a determination that the user has the usage rights for the proprietary artifact and a determination that the one or more input parameters comply with the one or more conditions in the artifact self-executing code.

19. The at least one non-transitory computer-readable medium of claim 18, wherein the instructions, that when executed by the at least one of the one or more computing devices, further cause the at least one of the one or more computing devices to: execute an attribution action for the new artifact based at least in part on the artifact self-executing code, wherein the attribution action comprises one or more of: transmitting a monetary amount to a creator of the proprietary artifact, transmitting demographic information to a creator of the proprietary artifact, or receiving a license for usage of the proprietary artifact.

20. The at least one non-transitory computer-readable medium of claim 19, wherein the one or more input parameters comprises at least one of text, graphics, photographs, sound, animation, video, interactivity, or multimedia.

21. The at least one non-transitory computer-readable medium of claim 19, wherein the instructions that, when executed by at least one of the one or more computing devices, cause the at least one of the one or more computing devices to determine whether the user has the usage rights for the proprietary artifact further cause the at least one of the one or more computing devices to: identify an electronic wallet; determine whether the electronic wallet contains an NFT in a plurality of unique NFTs corresponding to the proprietary artifact; and determine the user has the usage rights for the proprietary artifact based on the NFT in the plurality of unique NFTs corresponding to the proprietary artifact.

22. The at least one non-transitory computer-readable medium of claim 19, wherein the instructions that, when executed by at least one of the one or more computing devices, cause the at least one of the one or more computing devices to determine whether the one or more input parameters comply with the one or more conditions in the artifact self-executing code corresponding to the proprietary artifact further cause the at least one of the one or more computing devices to: process a user self-executing code generated based on the artifact self-executing code, the user self-executing code containing at least a portion of the one or more conditions from the artifact self-executing code corresponding to the proprietary artifact.

23. The at least one non-transitory computer-readable medium of claim 19, wherein the second training being supervised comprises preventing association of the proprietary artifact with at least one of a word or an image.

* * * * *